US 8,824,548 B2

United States Patent
Tuzel et al.

(10) Patent No.: US 8,824,548 B2
(45) Date of Patent: Sep. 2, 2014

(54) OBJECT DETECTING WITH 1D RANGE SENSORS

(75) Inventors: Cuneyt Oncel Tuzel, Cambridge, MA (US); Gungor Polatkan, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 615 days.

(21) Appl. No.: 13/092,408

(22) Filed: Apr. 22, 2011

(65) Prior Publication Data

US 2011/0200229 A1 Aug. 18, 2011

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ...... 375/240.12; 382/154; 382/103; 382/190; 382/159; 382/224; 348/584; 348/586; 348/43; 345/419

(58) Field of Classification Search
USPC ............. 375/240.12; 282/154, 103, 190, 159, 282/224, 173; 348/584, 586, 43; 354/419
See application file for complete search history.

(56) References Cited

U.S. PATENT DOCUMENTS

| 7,043,084 | B2 * | 5/2006 | Beardsley | 382/224 |
| 7,599,555 | B2 * | 10/2009 | McGuire et al. | 382/173 |
| 7,835,568 | B2 * | 11/2010 | Park et al. | 382/154 |
| 7,903,737 | B2 * | 3/2011 | Martinian et al. | 375/240.12 |
| 2002/0159628 | A1 * | 10/2002 | Matusik et al. | 382/154 |
| 2008/0063264 | A1 * | 3/2008 | Porikli et al. | 382/159 |
| 2008/0063285 | A1 * | 3/2008 | Porikli et al. | 382/190 |
| 2009/0315981 | A1 * | 12/2009 | Jung et al. | 348/43 |

* cited by examiner

*Primary Examiner* — Phuong Phu
(74) *Attorney, Agent, or Firm* — Dirk Brinkman; Gene Vinokur

(57) ABSTRACT

Moving objects are classified based on maximum margin classification and discriminative probabilistic sequential modeling of range data acquired by a scanner with a set of one or more 1D laser line scanner. The range data in the form of 2D images is pre-processed and then classified. The classifier is composed of appearance classifiers, sequence classifiers with different inference techniques, and state machine enforcement of a structure of the objects.

15 Claims, 2 Drawing Sheets

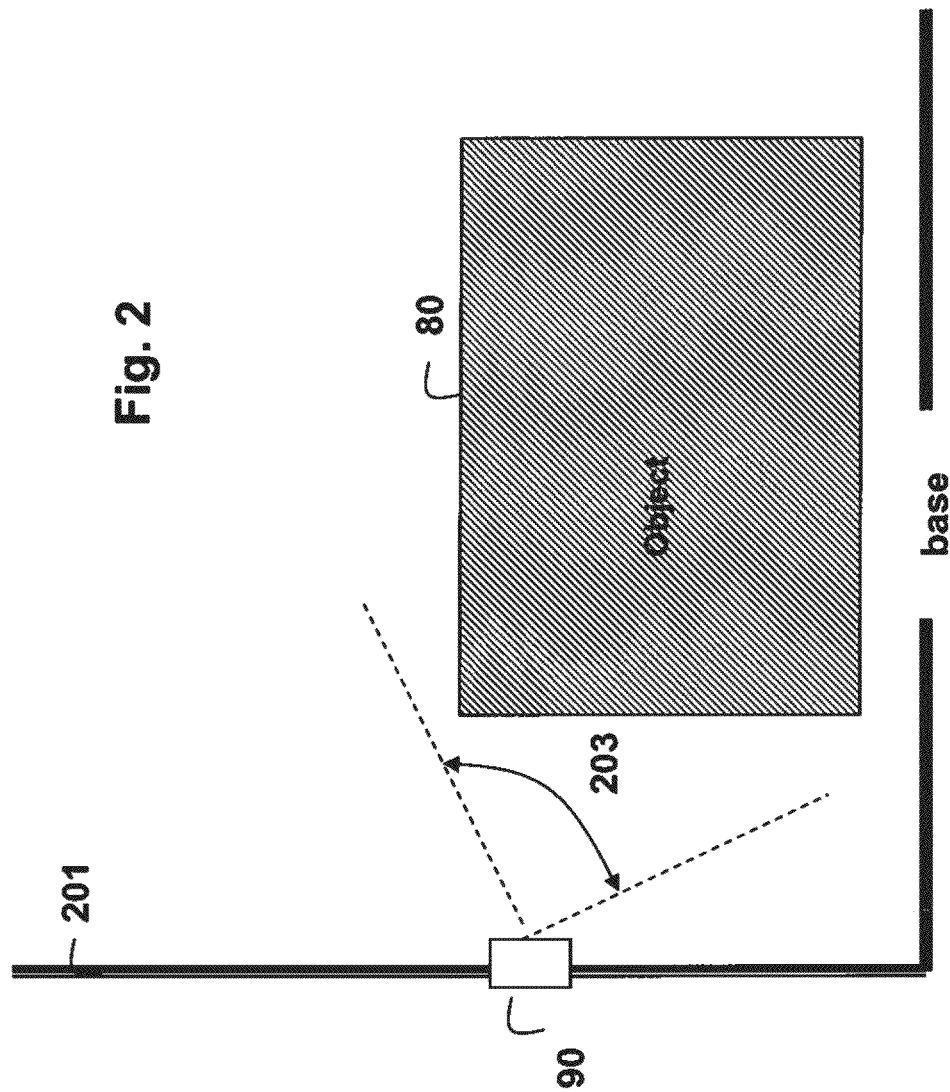

OBJECT DETECTING WITH 1D RANGE SENSORS

FIELD OF THE INVENTION

This invention relates generally to image processing, and more particularly to classifying objects using range scanners in computer vision applications.

BACKGROUND OF THE INVENTION

Object classification is widely used in computer vision applications. While most common applications use 2D camera images, there is a need for accurate classification methods for 3D range data. For example, the objects can be part moving on an assembly line.

The innovation of new sensor technologies results in new types of data collection techniques. In conjunction, new applications of automations appear and machines are substituted for more and more human labor.

Generally, object classification can use several type of data acquisition techniques such as inductive loop detector, video detector, acoustic detector, range sensor, and infrared detector. One system uses a laser sensor that outputs range and intensity information for object detection and classification.

SUMMARY OF THE INVENTION

The embodiments of the invention provide a method and system for classifying objects based on maximum margin classification and discriminative probabilistic sequential modeling of range data acquired by a scanner with a set of one or more 1D laser line scanner.

The method includes pre-processing and classification phases. Different techniques, such as median filtering, background and foreground detection, 3D reconstruction and object prior information, are used during pre-processing steps to denoise the range data, and extract the most discriminative features. Then, a classifier is trained. The classifier is composed of an appearance classifier, a sequence classifier with different inference techniques, and state machine enforcement.

BRIEF DESCRIPTION OF THE DRAWINGS

FIG. 2 is a schematic of a scanner with a 1D laser line scanners according to embodiments of the invention.

DETAILED DESCRIPTION OF THE PREFERRED EMBODIMENT

Notation

Figure 1:
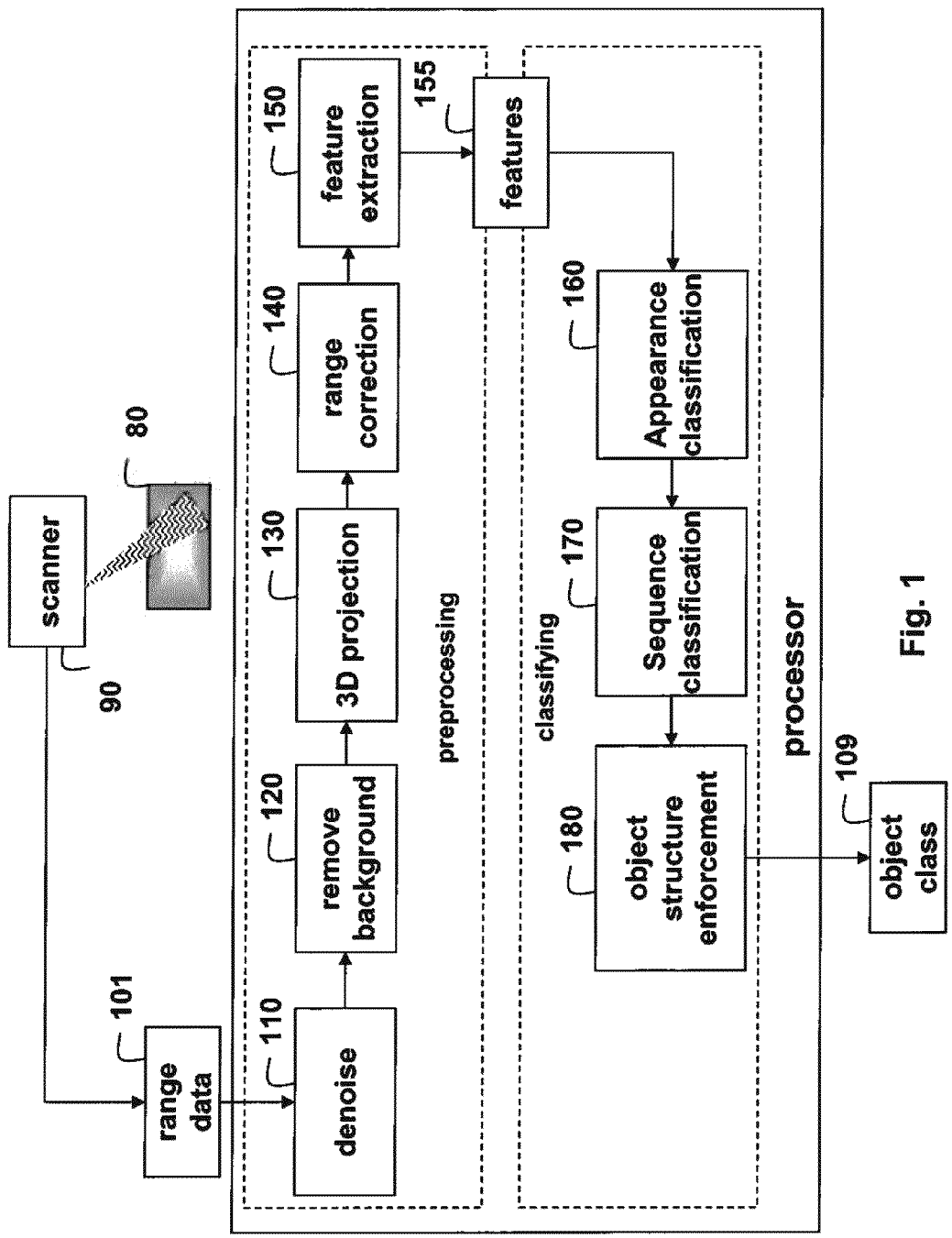
FIG. 1 is a block diagram of object classification according to embodiments of the invention.

We use the following notations to represent all the variables described herein, which are either explicitly defined or obvious from the description. We use bold character to represent vectors, i.e., data sequences in this case, and unbold character to represent single variables. For example, $x_i = \langle \chi_{i,1}, \chi_{i,2}, \ldots, x_i, T_i \rangle$ represents the sequence indexed by i, and $x_{i,j}$ represents the single variable of the sequence i at time step j. For an arbitrary single sequence, we skip the sequence index i and write the sequence as $X_i = \langle \chi_1, \chi_2, \ldots, \chi_T \rangle$.

Overview

FIG. 1 shows a system and method for classifying an object 80 according to embodiments of our invention. Range data 101 are acquired by a scanner 90 from the object 80 as input for the method.

As shown in FIG. 2, the scanner 90 includes a 1D laser line sensor. The scanner is arranged a on pole 202 near the object is to be identified. It is understood that the invention can be worked with just one sensor.

FIG. 2 also shows the field of view 203 for each sensor. The sensor acquires one or more side views of the object.

The 1D (line) measurements of the range data are accumulated over time, and 2D images of range profile of the object are constructed. The 2D range image is used for object type classification. Output is a class 109 of the object.

The above steps can be performed in a processor 199 connected to memory and input/output interfaces as known in the art.

The method includes a preprocessing phase, and a classifying phase. During preprocessing, we denoise 110 the range data, remove 120 irrelevant background information, 3D project 130 the remaining foreground pixels using range information, and sensor scanning geometries, correct 140 the range, and extract features 155.

For classification 170, we use outputs of a appearance classifier such as multi-class support vector machine (SVM) as features for a sequence classifier such as a conditional random field (CRF) classification to obtain initial class labels, enforce 180 object structure using discriminative properties of objects and feature attributes, and the sequential structure, and finally obtain the object class 109.

Preprocessing

Initial Denoising p One major problem with the range data is the noise due to non-zero angle of incidence, reflectance of an objects surfaces, imperfect operation of scanner, and interfering noise from the environment. Therefore, we first denoise the range data.

We use a 2D median filter to denoise the range data. Median filtering tends to preserve detail information, e.g., edges, while denoising the signal. We use an M×N neighborhood window around a corresponding pixel in the input image to be filtered, where M and N are specified empirically from the data. Median filtering reduces noise significantly even with a relatively small neighborhood. The tradeoff between the detail information and the amount of denoising is balanced by the order of the filter. The higher the order the higher the noise reduction, but less detail remains in the image.

Background Estimation and Removal

Some pixels can be totally corrupted during acquisition. Because of that, at the first step of background estimation, we determine "good" pixels and "bad" pixels based on a median amplitude of each row of pixels. Then, we use pixel based background estimation by fitting a single Gaussian distribution on the history of the range values of each good pixel when there is no object in the scene. At each new test sample from the same pixel, the determination is based on hypothesis testing as either foreground or background. For bad pixels, the decision is based on the hypothesis testing using the amplitude values of the signal. Finally, we use median filtering on the background mapping in order to remove irrelevant regions of noisy pixels.

3D Projection

Depending on environmental conditions and deployment errors, positions and orientations of the sensors relative to object can be inaccurate. To solve this issue, we back project good foreground pixels to 3D using initial sensor information, and fit a plane to a ground plane. We use a RANdom SAmple Consensus (RANSAC) process for plane fitting. This plane modifies the sensor location and orientation. The estimated base plane is assumed to correspond to the y=0 plane of a world coordinate system. Given the relative locations and orientations of the sensor with respect to base plane and the sensor field of view, we determine the 3D coordinates of each sensor measurement in a world coordinate system with back projection. The 3D projection is helpful in the following ways. We extract planar side view information from 3D values, which we use during range correction, and features. In addition, unlike 2D images, which are subject to perspective deformation of the world to image plane, the features we obtain from the 3D values are scale invariant and more informative.

Range Correction

The noise level of the measurements changes based on the surface reflectance. For example, a black object can result in noisy measurements. We exploit 3D information and planar side structure of the object to further correct range values. We assume that each column of measurement comes from a vertical line in 3D space. However different lines of scans can have different depth values (such as pole and body can be at different depth values). We initially determine the top 30% of depth values for each column of measurement.

Next, we median filter these measurements over time with an empirically specified filter order and obtain the depth values of each column of measurement. The larger the median filter order, the larger the area is assumed to have the same depth. Then, we correct outlier range values with the ones projected to the estimated plane. After range correction the noisy samples are relocated to correct positions and the object has a smooth structure.

Features

We use a binary height map as our features, which is equal to the quantized side view of the 3D projection. Initially, we take a part of the object above the base plane, and quantize such that each pixel corresponds to a small height value. For some objects, due to background removal, parts of the object that touch the base are removed. Therefore, we first detect the bottom of the object in the side view and shift the object to touch the base. Moreover, to incorporate partial temporal information, we take overlapping 70×11 patches of pixels using a sliding window technique. One patch is taken for each column on the image. Then, this patch is passed to classifying phase as a feature to obtain a classification of the center column.

Classification

Classification is performed by the following steps. First, the height features are classified in the appearance classification 160, and the appearance classification output is denoised using a sequence classification 170. This approach is highly accurate because it benefits from both the maximum-margin nature of the appearance classification such as SVM and the power of discriminative probabilistic sequential model such as CRF. At last, we use a structure enforcement using a finite state machine to prevent invalid predictions, e.g. a object with only a single tire.

Appearance Classification

The multi-class max-margin classifier SVM assigns initial labels to each time step of the image sequence. The sequential structure of the data is not taken into account during learning in this step except the windowing procedure in feature extraction. SVM takes the 70×11 dimensional height feature described above, and labels each features as either an object, body, tire or pole. The window with length 11 is shifted along the time axis, and each column of the range data is classified in that manner during testing. We use a linear kernel SVM, which enables fast processing.

Sequence Classification

The SVM assigns initial labels but does not consider the sequential structure of the object. Therefore, we use the CRFs as an additional layer to exploit the sequential correlations between time steps. This stage performs as a denoising part on the predictions of SVMs, removing inconsistencies. A sequential learning problem can be formulated as finding the optimal fiuictionf that can predict y=f(x), given N training sequences $$\{(x_i,y_i)\}_{i}^{N}=1, \text{ where } x_i = \langle \chi_i,1,\chi_i,2,\ldots,\chi_i,T_i \rangle,$$

and $$y_i = \langle y_i,1,y_i,2,\ldots,y_i,T_i \rangle$$

is the label sequence.

One common approach to solve the sequence labeling problem using probabilistic sequential modeling is to use generative models to sequence labeling problem, such as hidden Markov models (HMM). Another common approach is to use discriminative models. One such model is the Maximum Entropy Markov Model (MEMM). In addition to being a discriminative model, MEMMs provide the ability to model arbitrary features of observation sequences. One can handle overlapping features in this way. However, the label bias problem limits the performance of MEMMs.

Therefore, we use the CRFs as the sequence labeler to smooth noisy SVM outputs. A linear chain conditional random field is defined as $$p(y|x) = \frac{1}{Z(x)} \prod_{t=1}^{T} \Psi(y_t, y_{t-1}, x_t), \quad (1)$$

$$\Psi(y_t, y_{t-1}, x_t) \exp\left\{\sum_j \lambda_j g_j(y_{t-1}, y_t, x) + \sum_k \mu_k u_k(y_t, x)\right\}. \quad (2)$$

where $$\Psi(y_t, y_{t-1}, \chi_t)$$

is the potential function, $$g_j(y_{t-1}, y_t, x)$$

is the transition feature function from state, and $$y_{t-1} \text{ to } y_t: \mu_k(y_t, x),$$

is state feature function at state $y_i$; $\lambda j$ and a $\mu_k$ are the parameters estimated at the learning process, and $Z(x)$ is the normalization factor as a function of the observation sequence. Maximum likelihood parameter estimation of the above exponential family distribution corresponds to the maximum entropy solution.

Inference

After the model parameters are learned, an inference process labels a test sequence. We give a brief overview of conventional inference methods on probabilistic sequential models. One way of labeling a test sequence is the most likely labeling using the joint density y*=arg max), p(y|x). The solution can be efficiently determined via a Viterbi process using recursion $$(\delta_t(j) = \max_i \Psi(j,i,\chi_t)\delta_{t-1}(i),$$

which propagates the most likely path based on the maximum product rule. However, in many applications, accurately predicting whole label sequence is very difficult so that individual predictions are used. This is achieved via predicting $y_{i,t}$ from a marginal distribution $p(y_{i,t}|x_i)$ using a dynamic programming forward-backward procedure, The forward recursion is $$\alpha_t(j) = \sum_i \Psi(j, i, x_t)\alpha_{t-1}(i),$$

where $\alpha_t(j)$ are the forward variables. The backward recursion is $$\beta_t(i) = \sum_j \Psi_{t+1}(j, i, x_{t+1})\beta_{t+1}(j),$$

where $\beta_t(i)$ are the backward variables, from which the marginal probabilities can be determined.

Structure Enforcement

The final step of classification is the enforcement of object constraints. This module takes output of the CRF. If labels do not correspond to a valid object, in other words, the labels do not correspond to some finite state machine. We convert the labels to labels of a most similar valid object model defined in an object grammar. If the CRF result is valid, this means there is no need for any correction. This is the case for a great majority of objects. The process is an error correcting regular grammar parser.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for classifying an object in a scene, comprising the steps of:
    preprocessing a sequence of images, wherein each image is acquired of the object in the scene by a scanner, wherein the scanner includes a 1D laser line sensor, and each image includes columns of pixels, and each pixel has an associated depth value such that each image is a range image, wherein the preprocessing further comprises;
    denoising each image in the sequence;
    removing background pixels from each image;
    projecting, in 3D, each image to a 3D world coordinate system;
    correcting depth values;
    extracting features; and
    classifying the sequence of images, wherein the classifying further comprises:
        applying an appearance classifier to the features to obtain labels;
        applying a sequence classifier to smooth the labels; and
        enforcing a structure of the object to determine a class of the object, wherein the steps are performed in a processor.

2. The method of claim 1, wherein 1D laser line scanner scans a side of the object.

3. The method of claim 1, wherein the denoising uses a 2D median filter.

4. The method of claim 1, wherein a background of the scene is modeled with a Gaussian distribution for each pixel.

5. The method of claim 1, wherein a ground plane in the scene is estimated using a RANdom SAmple Consensus (RANSAC) process.

6. The method of claim 1, wherein noisy range measurements on surfaces of the object are corrected by fitting vertical planes to each column.

7. The method of claim 1, wherein the features are scale invariant.

8. The method of claim 1, wherein the features are binary height maps equal to a quantized side view of the 3D projection.

9. The method of claim 1, wherein the scanner is mounted on a pole near the object.

10. The method of claim 1, wherein the labels are determined by evaluating with the appearance classifier by a sliding window technique along a time axis.

11. The method of claim 1, wherein the appearance classifier is a support vector machine.

12. The method of claim 1, wherein the outputs of the appearance classifier are smoothed with the sequence classifier.

13. The method of claim 1, wherein the sequence classifier uses a conditional random field model or a hidden Markov model.

14. The method of claim 1, wherein the structure enforcing converts the labels to labels of a most similar valid object model defined in a object grammar.

15. The method of claim 1, wherein the structure enforcing uses an error correcting regular grammar parser.

* * * * *